UNITED STATES PATENT OFFICE.

JAMES WEBSTER, OF BIRMINGHAM, COUNTY OF WARWICK, ASSIGNOR TO THE ALUMINIUM COMPANY, (LIMITED,) OF LONDON, ENGLAND.

FLUX TO BE USED FOR THE REFINING OF METALS.

SPECIFICATION forming part of Letters Patent No. 394,742, dated December 18, 1888.

Application filed April 6, 1886. Serial No. 198,008. (No specimens.) Patented in England October 15, 1885, No. 12,344; in France November 3, 1885, No. 172,038, and in Belgium November 5, 1885, No. 70,746.

*To all whom it may concern:*

Be it known that I, JAMES WEBSTER, engineer, a subject of the Queen of Great Britain, residing at Birmingham, in the county of Warwick, England, have invented Improvements in Fluxes to be Used for the Refining of Metals, (for which I have been granted patents in the following countries: Great Britain and Ireland, No. 12,344, October 15, 1885; France, No. 172,038, November 3, 1885; Belgium, No. 70,746, November 5, 1885;) and I do hereby declare that the following specification is a full, clear, and exact description of the said invention, and one which will enable others skilled in the art to which it appertains to make and use the same.

My invention relates to improvements in fluxes adapted to be used in the refining of metals.

The process by which the fluxes, the composition of which forms the subject of the present invention, are in the main prepared is fully set forth and claimed in an application filed November 17, 1885, Serial No. 183,105, for Letters Patent; and I hereby disclaim any intention of claiming any part of the process described and claimed in said application, which process is as follows: I make use of the waste fluid from any chemical works in which calcium chloride is found in sufficient quantity. Among those branches of manufacturing chemistry which yield a fluid suitable for the purpose of my invention I instance the manufacture of ammonium carbonate from ammonium chloride, although I would have it distinctly understood that this is not the only chemical industry which yields a waste fluid adapted for use as the raw material of my process. I first fill a tank of convenient proportions with the waste fluid and throw into it as much slaked lime as suffices to form a stiff paste. This stiff paste of saturated lime is then to be removed to a drying-stove, the temperature of which is to be gradually raised to about 250° Fahrenheit, but not higher. During the process of drying the mass is to be well stirred or raked about. This raking and the limited temperature effect the evaporation of all the water, but without affecting the chemical nature of the mass. The tank is filled a second time with fluid and the dried mass from the drying-stove thrown in. When it has absorbed as much fluid as it is capable of taking up, it is subjected to a second drying, conducted as above described. As this second drying is progressing, a number of lumps will be formed, which is indicative of the absorption by the lime of calcium chloride from the fluid. At the conclusion of the second drying the mass may be ground, to enable it to absorb more fluid with greater readiness. The tank having in the meantime been filled a third time with fluid, the ground mass is thrown therein and stirred about until it is thoroughly saturated, and then dried as before. I find that this dried mass of super-saturated lime is, as a rule, incapable of absorbing any more of the chlorine compounds from the fluid after the third immersion, if the processes described above have been carefully performed; but I do not confine myself to three immersions of the lime in the fluid, followed by three dryings, inasmuch as the number can be varied, if required or desirable, provided that the lime be allowed to take up and retain as large a proportion of the chlorine compounds of the fluid as it is capable of doing, this absorption of the calcium chloride by the immersed lime being an essential feature of my process, and its presence consequently necessary to the success of my invention. I find that if the lime be immersed twice only the melting, next to be described, cannot be carried out. The dried mass is, after the third immersion, introduced into a furnace of the well-known "reverberatory type," worked at a glowing red heat, at which the mass readily melts and is drawn off as a viscid mass of a mixed brown and dirty yellow color, and cast into blocks for convenience in dealing with it. As the blocks cool, they turn black and are highly caustic and deliquescent. It is therefore necessary to take proper precautions against their being unduly exposed to the weather.

The melting process above described must not be carried on at too high a temperature. If the temperature be raised unduly above that specified—viz., a glowing red heat—the molten mass will solidify and fall to a white powder.

In carrying out the process above described I do not confine myself to any particular arrangement of plant, as the size and relative numbers of vats and furnaces may be varied according to circumstances or convenience, or the special requirements of any particular installation.

The flux which is the result of the said process has the following composition, as ascertained by analysis:

|  | Per cent. |
|---|---|
| Calcium chloride | 35.08 |
| Lime | 33. |
| Carbonate of lime | 17.04 |
| Sulphate of lime | 1.37 |
| Oxide of alumina and iron | 2.5 |
| Silica | 5.55 |
| Water | 4.52 |
|  | 99.06 |

The three substances standing at the head of the above list are the essentials of my improved flux. The five remaining—viz., the sulphate of lime, the magnesia, the oxide of alumina and iron, the silica, and the water—are accidentals only, and their presence does not affect the utility of my flux either one way or the other. They might, therefore, as far as this invention is concerned, be omitted.

The only iron present in my flux is present as an oxide, the percentage, however, being very small. The absence of iron from the materials from which my flux is prepared, as well as from the flux, (except in the exceedingly small proportion shown in the above analysis,) is an essential feature of my invention, for if this metal were present in any considerable quantity the flux could not be used successfully in the refinement of such a metal as aluminium.

I will now describe the best methods of using my improved flux. For refining copper or brass, I use one and one-half per cent. For refining nickel, I use three per cent. For refining zinc, I use one per cent. For refining aluminium, I use two to four per cent. For refining gold or silver, I use three and one-half to four per cent.

The above quantities are calculated upon the weights of metal to be treated. The percentage of flux to be used with aluminium depends upon the quantity of iron in the metal; but as the flux acts as an oxidizing agent upon the iron in virtue of the caustic alkalies which it contains it will always be easy to calculate the exact percentage of flux required by any particular grade of aluminium when once the percentage of iron present therein has been ascertained by analysis.

The flux is always used in one way irrespective of the relative quantity to be used or of the metal to be operated upon. A small quantity is put into the crucible or refining-furnace (whichever may be used) first, and the metal to be refined is next added. The remainder of the flux is then thrown upon the metal when it has reached a molten condition, or it may all be introduced before the metal is melted.

My flux can be used according to this method and with satisfactory results with any of the crucibles or furnaces in general use.

For producing a purer pig-iron by the ordinary smelting process, I mix from three to four per cent. of the composition obtained as above described, calculating the quantity upon the weights of the iron-stone, with the other materials and feed them into the blast-furnace in the ordinary way.

For producing a refining agent for use in the refining-furnace, I mix the composition obtained as before described with from fifteen to twenty per cent. of black oxide of manganese. This proportion of manganese, calculated upon the weight of the flux, is thrown into the molten composition while it is still in its furnace and stirred up.

Any of the oxides of manganese may be used for the purposes of this invention; but I have found that the well-known black oxide ($MnO_2$) gives very satisfactory results. The percentage of manganese to be added depends of course upon the purity of the iron. The purer the iron is when it comes from the blast-furnace the smaller will be the percentage of manganese required. After the percentage of manganese has been thoroughly amalgamated in the way described the manganese flux is thrown into the refining-furnace, the proper proportion being two and one-half per cent., calculating it upon the weight of the iron. The flux is to be thrown in as soon as the pigs are melted and the whole agitated thoroughly.

I have specified twenty per cent. of manganese as the maximum quantity I use in compounding my manganese flux; but I wish to point out that although as much as this might be required with very low grades of iron, if ordinary-quality pigs are used mild steel is produced from them at one operation by using this quantity of my manganese flux. As soon as the manganese flux is thrown into the refining-furnace and the whole stirred about well, the temperature falls and small jets of flame leap up from the surface of the molten metal. Then the temperature rises, such impurities as sulphur and phosphorus being completely eliminated by oxidation and carried away up the chimney.

The reduction of the percentage of carbon is regulated in the ordinary way.

I have referred to and quoted from a prior specification as describing the best process by which the fluxes the composition of which forms the subject of the present application for Letters Patent are in the main prepared, and when it is taken into consideration that I use waste fluids which contain a large percentage (two-thirds) of the materials entering into the composition of the flux it will be seen at once that the cost of the said process, which is partly extractive and partly synthetic, must necessarily be less costly than one wholly synthetic, although there is no reason other than the question of cost why my flux should not be compounded by mixing together the three principal ingredients in the relative proportions above specified.

I am quite aware that it has been heretofore proposed to use various chemical substances and combinations thereof as fluxes to be used in refining iron and steel, and I wish it to be distinctly understood that I lay no broad claim to fluxes which are compositions of several chemicals for this purpose.

Among numerous compositions which have been proposed to be used as fluxes for smelting and refining purposes are the following:

1. Manganese and common salt.
2. Epsom salts.
3. Lime or lime and oxide of iron, or magnesia and chloride of calcium, or fluoride of calcium, or chloride of magnesium, or chloride of sodium.
4. Lime and common salt.
5. Oxide of iron and chloride of sodium, or chloride of calcium, or fluoride of calcium.

I will now explain the difference between the composite fluxes above quoted and my invention.

Before going into detail I wish to point out that the relative proportions of the several substances which form my composition are definite. I specify them distinctly without leaving them to be found out by experiment. They are the proportions which I find will always yield the best results, and they cannot be departed from without sacrificing efficiency.

With reference to No. 1, I point out that I do not use a composition of manganese and common salt. This composition is not a part of my invention, and I therefore lay no claim to it.

With reference to No. 2, Epsom salts is not present in my flux. Neither would this salt, if present therein, benefit it. It is true there is a small percentage of magnesia present—less than one per cent.; but, as I have already explained, its presence is accidental and itself inoperative. I therefore lay no claim to the use of manganese, nor to the use of any salt thereof, either singly or combined with common salt.

With reference to No. 3, I have to point out that out of the seven substances mentioned three—viz., fluoride of calcium, chloride of magnesium, and chloride of sodium—do not appear at all in the composition of my flux. Two others—oxide of iron and magnesia—are present accidentally only. They are inoperative for the purposes of my invention. Their presence forms no part of my invention; neither do I attempt to lay any claim thereto.

With reference to the two remaining substances in No. 3—viz., lime and calcium chloride—I use both these substances in my flux, but in definite relative proportions and in combination with a third substance—viz., carbonate of lime—which is not present in said No. 3 at all. I wish it to be distinctly understood that I lay no broad claim to the use of a mixture of lime and calcium chloride as forming a flux, nor to a mixture of these two substances only, even in the relative proportions given in the analysis of my flux, for a mixture of these two substances only without carbonate of lime will not achieve the purposes of my invention.

With reference to No. 4—viz., lime and common salt—I have to point out that I do not use this combination or composition. It does not form part of my invention; neither do I lay any claim to it.

With reference to No. 5, I have to point out that, although there is oxide of iron in my flux, (*vide* analysis above,) it is there only accidentally and not intentionally. Its presence is altogether inoperative. I do not make use of either chloride of sodium or fluoride of calcium, nor of chloride of calcium in composition with oxide of iron. This last-mentioned composition—viz., oxide of iron and chloride of calcium—is not part of my invention, and I therefore lay no claim to it.

I claim—

The hereinbefore-described composition of matter to be used as a flux for refining metals, and consisting of the following substances in the proportions by weight herein specified, viz: calcium chloride, 35; lime, 33, and carbonate of lime, 17.

In testimony whereof I have hereunto set my hand.

JAMES WEBSTER.

Witnesses:
 FRAS. HY. FISHER,
*Solicitor's Clerk, 197 Clifton Road, Aston Manor.*
 THOMAS COOKE,
*Solicitor's Clerk, 168 Wilton Road, Aston Manor.*